March 8, 1949.　　　R. E. RISLEY ET AL　　　2,463,907
METHOD AND APPARATUS FOR WELDING PIPE
Filed Nov. 23, 1944　　　4 Sheets-Sheet 2

INVENTORS
ROGER E. RISLEY
AND PAUL B. SCHARF
BY
ATTORNEY.

March 8, 1949.  R. E. RISLEY ET AL  2,463,907
METHOD AND APPARATUS FOR WELDING PIPE
Filed Nov. 23, 1944  4 Sheets-Sheet 4

INVENTORS
ROGER E. RISLEY
AND PAUL B. SCHARF
BY
Robert E. Burns
ATTORNEY.

Patented Mar. 8, 1949

2,463,907

UNITED STATES PATENT OFFICE 2,463,907

METHOD AND APPARATUS FOR WELDING PIPE

Roger E. Risley and Paul B. Scharf, Bradford, Pa., assignors to Dresser Industries, Inc., Cleveland, Ohio, a corporation of Pennsylvania Application November 23, 1944, Serial No. 564,822

15 Claims. (Cl. 113—59)

The present invention relates to a method and apparatus for welding pipe, the term pipe being used broadly to include casing, piling, and other cylindrical sections. The invention is particularly applicable to joining successive pipe sections by welding in the construction of pipe lines.

In welding pipe by fusion welding, the sections of pipe are united by laying a bead of molten metal along the weld line, for example, by melting the adjacent edges of the sections being welded, or by supplying metal from an electrode welding rod or filler rod. The metal that is to form the weld is thus fused at least to the point of semi-fluidity, so that it will flow into the weld line to unite the adjacent sections. One of the inherent difficulties of welding pipe in a pipe line is that present methods require the laying of a bead around the pipe, starting at or near the top of the pipe, going down one side, across the bottom, and then up the other side of the pipe to the starting point. Welding "down-hand" across the top of the pipe, where the molten metal is in a relatively horizontal plane, is satisfactorily accomplished, but on the sides and bottom of the pipe, the appearance and character of the weld are less satisfactory. Since the action of gravity on the molten metal is not identical in all positions around the pipe, the metal does not flow properly in the weld line to produce a satisfactory weld. The present methods, therefore, do not provide a means of making a practical weld of uniform quality and soundness, or at uniform speed of application.

In welding pipe lines by hand methods, a large crew is required to handle the pipe and operate the welding equipment. When the pipe is being welded in a trench by hand methods, the trench must, at considerable expense, be enlarged at the joints of the pipe so that the welding operator may work completely around the pipe. This type of weld is called a "Bell-hole" weld, and the character of such a weld depends on the skill of the operator. Unless the operator is highly skilled, and exercises extreme care in making the weld, a uniform seam that will pass the test on the line will not be obtained.

Moreover, it is customary in hand welding to "tack weld" the sections together before proceeding with the weld around the circumference of the pipe. This "tack welding" has been necessary to prevent relative movement of the two sections, while the circumferential weld is being completed. The necessity of "tack welding" the sections, in hand welding methods, not only requires additional time, equipment, materials and effort, but may produce defects in the pipe joint because the "tack weld" spots result in non-uniformity of the final weld.

It is an object of the present invention to provide a method of welding pipe, whereby the inherent difficulties and disadvantages of the prior art are overcome and avoided. In accordance with our invention, the pipe may be welded either in the trench, or above, or alongside the trench, into a continuous length. At each of the weld joints of the pipe line, a uniform weld is produced throughout the circumference of the pipe, eliminating the serious difficulties heretofore encountered in welding up or down the sides of the pipe, or along the bottom. The non-uniformity and defects inherent in welds formed by prior art methods are thereby avoided.

A further object of our invention is to increase the speed with which pipe lines can be constructed, while at the same time decreasing the cost of construction. The method can be carried out by a small number of operators making unnecessary the large crews heretofore required and eliminating the need of skilled hand welders. No liner or back-up ring is required at the weld line, and moreover, the cost, delay and disadvantages of tack welding are avoided. The method in accordance with our invention also eliminates the expense of digging the "Bell-holes" required in hand welding methods, to afford sufficient room to work around the pipe. The construction of a pipe line, in accordance with our novel method, is relatively independent of weather conditions, since cold weather does not affect the operation. Moreover, the method of welding pipe lines, in accordance with the present invention, has the further advantage of increased safety as it eliminates the danger of personal injury incident to previous welding methods, as for example, the danger of falling from scaffolds or of being hit by falling objects when working along or under the pipe.

Another object of the present invention is to provide apparatus for carrying out our novel method of welding pipe. In its preferred form the apparatus, in accordance with our invention, is a self-contained unit comprising an automatic welding head, and means for gripping and rotating the pipe sections so that the ends of the sections that are to be welded together are rotated past the welding head. By operation of the welding head during rotation of the pipe sections, a continuous weld is formed progressively around the entire circumference of the pipe. The welding apparatus is preferably carried on a self-propelled vehicle, so that in laying a pipe line, by welding additional sections successively to the end of the line, the apparatus can move along the line from one joint to the next. A single source of power, for example, a Diesel or other internal combustion engine, may be used to supply power for propelling the unit, gripping, positioning and rotating the pipe, and operating the welding head. The operation of the apparatus is preferably controlled by a coordinated control system, whereby fully automatic and accurately controlled welds are made without reliance on the skill of the individual operators.

Other features, objects, and advantages of our invention will be apparent from the following description and claims, and from the accompanying drawings, in which a method of welding pipe, in accordance with our invention, is illustrated schematically and by way of example, and in which a pipe welding unit is shown by way of example to illustrate one embodiment of apparatus in accordance with the present invention.

In accordance with our novel method, the adjacent ends of adjacent pipe sections are tightly gripped and held in position to be welded together, and while thus held, the pipe sections are rotated past welding means positioned to form a weld between the adjacent ends of the section. In welding successive sections to a line of pipe, the end sections of the pipe line is rotated by torsioning or twisting the pipe. As the amount the pipe can be twisted is subject to practical limitations, the pipe is preferably twisted first in one direction, and then in the opposite direction, so that it is not necessary to turn the free ends of the pipe more than approximately 180° from its neutral position. In welding a long pipe line, the twisting or torsioning of the pipe is distributed over a considerable length, for example, several hundred feet, or in the case of larger pipe, as much as several thousand feet, so that the amount of twist, in any one section, is very small. The additional section of pipe that is to be united to the pipe line, is held in position to be welded to the free end of the end section of the line, and at least during the actual welding operation, is rotated in unison with the end section so that there is no relative movement between the two sections during welding. By thus gripping and holding the two sections immobile relative to one another, while rotating them past the welding head to form a continuous weld progressively around the circumference of the pipe, a strong uniform weld seam is produced. The method, in accordance with our invention, is equally applicable to either butt, or lap welds. In forming a butt weld, the adjacent ends of the two pipe sections are gripped and held in alignment with the ends abutting one another, or slightly spaced. If a lap weld is desired, one of the sections may be provided at its end with a bell portion adapted to receive the end of the other pipe, the two sections being held in proper position, while being rotated past the welding head, to form a weld between the end of the bell and the adjacent side wall of the inner section. Regardless of the type of weld desired, any preliminary tack-welding of the sections is unnecessary since the sections are tightly gripped and held immobile to one another during rotation. Moreover, tack-welding is undesirable, as it interferes with the continuous and uniform nature of the weld.

Figures 1, 7, 8:
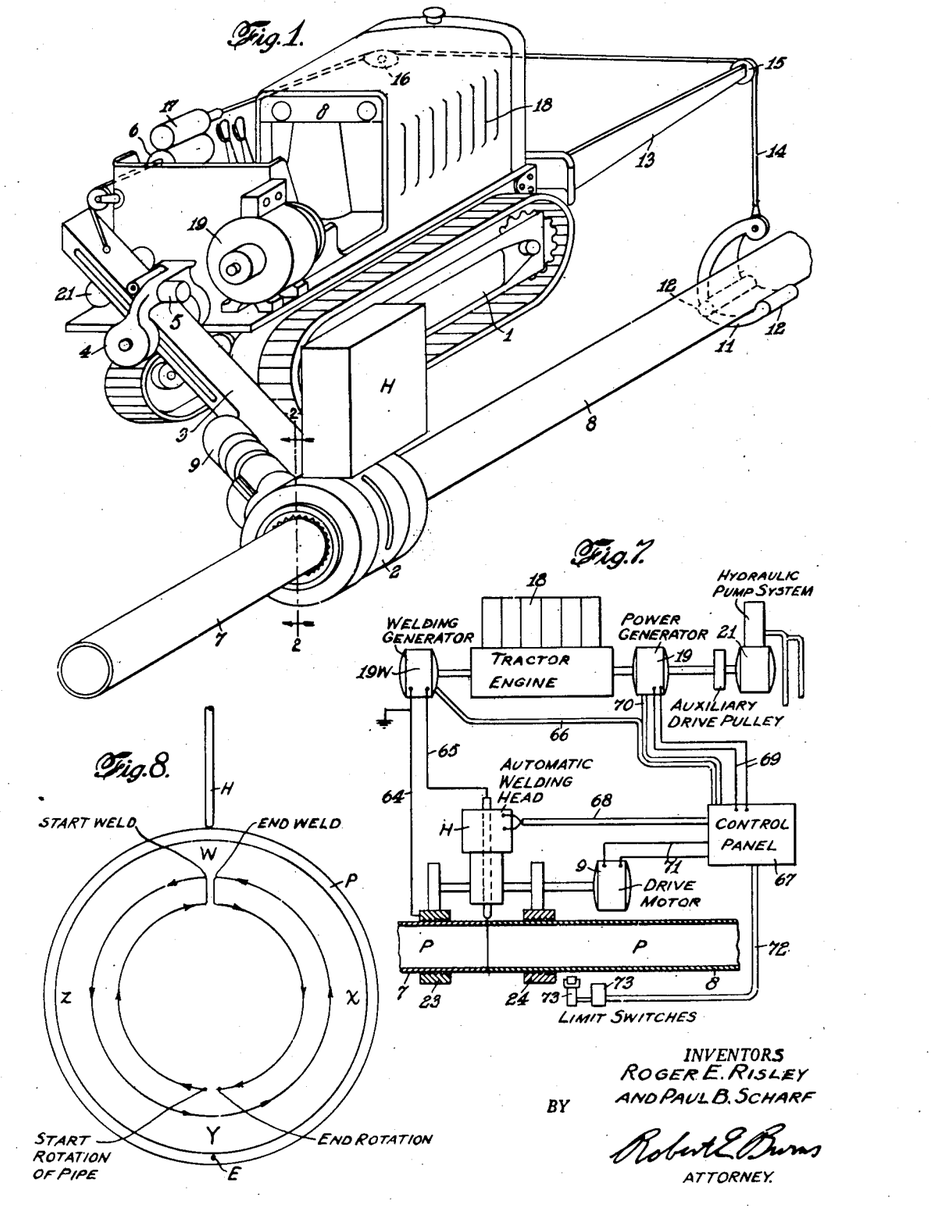
Fig. 1 is a schematic perspective view of apparatus in accordance with our invention, showing also a portion of the pipe being welded by the apparatus.
Fig. 7 is a schematic view of the mechanical and electrical connections between the several elements of the apparatus, including electrical controls for automatic operation.
Fig. 8 is a schematic view illustrating the cycle of operations in one form of our invention.

A complete cycle of a welding operation, in accordance with our invention, is illustrated by way of example, in Fig. 8 of the drawing. In this figure, the welding head indicated by reference letter H, is represented schematically as the electrode of an electric welding unit. In making a fusion weld, the metal that is to form the weld, whether supplied by the stock being welded, or from another source, for example an added filler material, a welding rod, or the electrode, is heated to the point where it will flow into the weld area, forming a "melt" to unite the two pipe sections. To obtain the best results, the welding head, is, therefore, placed in such position relative to the line of weld, for example, at or near the top of the pipes, as shown in Fig. 8, that a weld melt is maintained at the top of the weld line and the molten metal flows by gravity into the weld line. As the welding head remains in this position throughout the formation of the weld, the pipe sections being rotated past the stationary welding head, the flow of metal is the same throughout the circumferential extent of the weld line, forming a strong and uniform seam.

In the cycle of operations illustrated in Fig. 8, the rotation of the pipe P, is indicated by the small arrows shown inside the pipe. Starting with the pipe P, in its normal or neutral position, torque is applied to the pipe to twist it approximately 180° in a clockwise direction, so that the point E on the pipe, travels through the arc Y—Z—W, thus reaching a position in which the point E is immediately beneath the welding head H. The direction of rotation is then reversed, and the welding head H is put in operation to form a weld between the ends of the pipe sections, while the pipe is rotated approximately 360° in a counterclockwise direction. During this welding operation, the point E on the pipe passes through the complete circle W—Z—Y—X—W, so that a continuous weld is formed all the way around the circumference of the pipe. During the welding operation, the speed of rotation of the pipe, and the operation of the welding head are coordinated and controlled so that a uniform weld is formed throughout the circumferential extent of the weld line. After the weld has been made all the way around the pipe, the ends of the weld being overlapped, if desired, the operation of the welding head is stopped and the pipe is untwisted by being rotated approximately 180° in a clockwise direction back to its normal position of rest. Thus, in the untwisting operation, the point E travels approximately through the arc W—X—Y. In this cycle of operations, it will be noted that although the pipe is rotated continuously in the same direction through approximately 360°, during the actual welding operation, it is never twisted more than approximately 180° from its neutral or unstressed position.

After the initial weld bead has been laid around the pipe, as described above, one or more additional beads may be laid on the pipe joint over the first, by repeating the welding run in the same sequence. Alternatively, the pipe may be rotated, first in one direction and then the other, and the welding head operated during both directions of rotation, continuing the operation until a bead of the desired size has been built up. The size of the bead may also be increased by decreasing the speed of rotation of the pipe, and by weaving or oscillating the welding electrode back and forth across the pipe joint at predetermined amplitude and speed, or by increasing the amount of filler rod fed into the melt. When the weld is formed by a plurality of successive runs, adjustments as to speed of rotation, rate of feed of the filler rod, etc., may be made between the runs to build up the bead to any desired height. Where a plurality of beads are laid one over the other, the beginning and ending of successive beads may be staggered so that all the beads do not start and finish at the same point in the circumference.

While the welding head is illustrated in the drawings as being an electric welding unit, it will be understood that any heat source of sufficient concentration and intensity to produce a weld may be used, for example, a carbon arc, a metallic electrode arc, acetylene or other torch, thermit, etc. The welding head is preferably automatic to provide a constant though adjustable rate of weld. For example, if an electric arc is employed, automatic feeding mechanism maintains the electrode tip at a suitable distance or deposit rate with respect to the work, while the pipe is rotated under it, and automatically adjusts the electrode to any irregularities in the pipe ends as they move under the electrode. The welding head may also provide means for automatically feeding a filler rod and autogenizing it into the weld at a predetermined and adjustable rate. The rod or electrode may be given any desired position angularly or laterally with respect to the pipe surface.

Figures 5, 9:
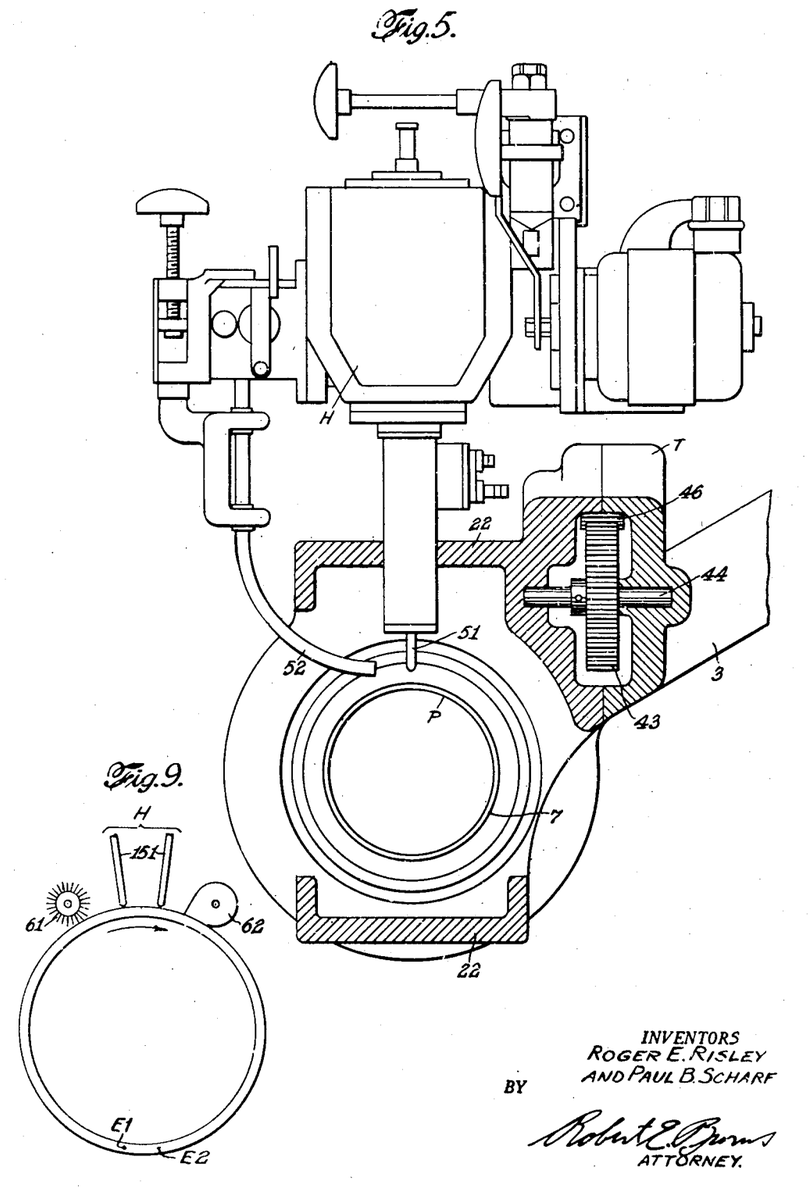
Fig. 9 is a schematic view similar to Fig. 8, but showing a modification.

The time required to complete the weld may be materially decreased by the provision of a plurality of electrodes or welding units adapted to function simultaneously or at relatively short time intervals apart. For example, with two electrodes spaced a suitable distance apart circumferentially of the pipe, as illustrated in Fig. 9, two beads can be laid concurrently. With this arrangement the first arc is started, and as soon as the second electrode is over the start of the first bead, and approximately one half inch ahead or behind the first bead, the second electrode is put into operation to lay a second bead over the first. When the first bead has been laid throughout the circumference of the pipe, the first arc is stopped, and as the second bead arrives at its starting point, the second arc is in turn stopped so that the resulting beads are laid in overlapped or staggered relation. Alternatively, with the arrangement shown in Fig. 9, the two welding units may be put into operation simultaneously and operated while the pipe is rotated through approximately 360°, so that the ends of the respective beads laid by the welding units will be staggered a distance approximately equal to the circumferential spacing of the two welding units. It will be apparent that within the space limitations of the pipe, any desired number of electrodes or welding units may be used, and that they may be placed either outside or inside the pipe. Moreover, the units may be alike or may be different from one another, and they may be adjusted for the same or different welding intensities or rates of weld. By suitable selection and adjustment of interchangeable parts or units, it is possible to obtain a number of combinations to meet different field conditions as for example, when welding old pipe or new pipe, concentric or eccentric pipe, thick walled or thin walled pipe, and other variations that may be encountered.

The method, in accordance with the present invention, wherein the adjacent pipe sections are tightly gripped and rotated at predetermined speed about their longitudinal axis, while being held immobile relative to one another, has the further advantage that it lends itself to carrying out other operations incident to welding. For example, by positioning cleaning mechanism in advance of the welding head, the ends of the pipe may be cleaned immediately prior to being welded together, as the pipe is rotated about its axis. The cleaning mechanism may, for example, take the form of chipping, peening, scraping, brushing, grinding or etching devices or the like, or a combination of one or more units. A flux or other preparation may likewise be applied to the ends of the pipe prior to welding, merely by placing a suitable applicator in advance of the welding head, so that the ends of the pipe will rotate past it as they are being welded. By positioning suitable mechanism on the opposite side of the welding head, the metal adjacent the weld line may be treated subsequent to welding, for example by being peened or heat-treated. It will be understood that various combinations of units may be used so that as the ends of the pipe are rotated, they may, for example, be concurrently cleaned, welded, peened, cleaned and coated.

In carrying out our invention, the operations of starting, stopping, changing feed, and reversing the direction of rotation of the pipe, starting and stopping the welding head, and operating auxiliary mechanism, is preferably coordinated by interlocking automatic control. The resulting automatic operation makes it possible to weld pipe lines rapidly and inexpensively, while at the same time assuring that each joint of the pipe line is properly welded to provide a uniform and reliable seam.

After the welding of one section has been completed, the apparatus is moved on to the next joint and a further section is welded to the pipe line. Successive sections of pipe are thus welded to the pipe line one after the other, thereby avoiding the difficulty encountered in certain prior art methods, of having to handle long lengths of pipe made up of a plurality of sections.

In Fig. 1 of the drawings there is shown by way of example, one embodiment of apparatus for carrying out our invention. Details of the apparatus are shown in Figs. 2 to 6, and a schematic diagram of the controls is illustrated in Fig. 7. In the embodiment selected for illustration in the drawings, the complete welding units, including an automatic welding head, and means for gripping, supporting and rotating the pipe, are carried on a chassis of a self-propelled vehicle shown in the form of track laying truck or tractor, designated in general by the reference numeral 1. The means for gripping and rotating the pipe is shown in the form of a torque head 2, carried on a boom or derrick 3, supported on the vehicle for example by a bracket 4, and provided with power means for example a motor 5, and hydraulic cylinder 6 for manipulating the boom to position the torque head 2 to receive the pipe and hold it in proper position while it is being rotated and welded. The torque head 2 is adapted to grip the free end of the end section 7 of the pipe line, and also the adjacent end of a further section 8 that is to be welded to the line. The adjacent ends of the two pipe sections 7 and 8 are rigidly held by the torque head 2, in proper position to be welded together. When a butt weld is to be formed, the pipe sections are held in alignment with adjacent ends abutting or slightly separated, the ends being square or beveled, as desired. If the sections are to be lap welded, the end of one section may be provided with a bell adapted to fit over the adjacent end of the other section, when in position for welding. The torque head 2 is also provided with means driven, for example, by an electric or other motor 9, for rotating the sections being welded. The rotating mechanism twists the pipe line by turning the free end of the end section 7, and rotates the added length 8 in unison therewith, while holding the adjacent ends of the two sections in proper position for welding, and maintaining them immobile relative to one another during rotation of the pipe about its longitudinal axis. The sections are thus held against movement relative to one another, while being rotated, thereby rendering any tack welding or other hand welding of the sections unnecessary.

In addition to being held by the torque head 2, the added pipe section 8 is preferably supported at a distance from the torque head, for example, by a cradle 11, having rollers 12 for rotatably supporting the pipe. The cradle 11 is shown suspended from a boom or arm 13, projecting laterally from the front end of the vehicle, by a cable 14 which passes over a pulley 15 at the end of the arm, and over another pulley or pulleys 16, the other end of the cable being connected with mechanism for example a hydraulic cylinder 17 for raising and lowering the cradle. Additional means may, if desired, be provided for manipulating the arm 13 to move the cradle 11 longitudinally or laterally of the pipe line.

The boom 3, that carries the torque head 2 also carries a welding head designated in general by the reference letter H. The welding head H is positioned in such relation to the torque head 2 as to be operable to weld the adjacent ends of the two pipe sections 7 and 8 together as they are rotated by the torque head. The welding head may be of any desired type, but is shown by way of example, as being an automatic electric arc unit adapted when in operation to establish and maintain a uniform welding arc of predetermined and variable intensity. The electrode or other welding element for producing the concentrated and intense heat required for fusion welding, is positioned adjacent the adjoining ends of the pipe sections, when held in the torque head 2, and in such relation to the pipe that the metal fused by the welding head will, under the effect of gravity or other forces acting on the metal, flow in the weld line and solidify to weld the ends of the sections together uniformly around the circumference of the pipe. In the embodiment illustrated in the drawings, the welding element is positioned above the line of weld, being located above the adjacent ends of the pipe sections. As the welding head is carried by the same boom that carries the torque head 2, it is automatically positioned in proper relation to operate on the adjacent ends of the pipe sections, when the sections are properly positioned and clamped in the gripping means of the torque head.

The vehicle 1 also carries considerable power means for operating the components of the apparatus. In the embodiment illustrated in the drawings, a single power source, such for example as the Diesel or other internal combustion engine 18, provides power for the entire unit. Thus, the engine 18 may be utilized to propel the vehicle and also to drive one or more electric generators 19, for operating the electrical portions of the apparatus as well as a hydraulic pump unit 21, for supplying fluid pressure to operate the hydraulic cylinders 6 and 17 and other hydraulically operated parts of the mechanism. It will be understood that in providing motive power for the component parts of the apparatus, mechanical, electrical or hydraulic drives may be selected as desired within the limitations of each type of drive. With the particular apparatus illustrated in the drawings, a single type of fuel, i. e., the Diesel or other fuel used by the engine 18, furnishes power for the entire apparatus. The vehicle 1 is provided with a suitable tank or tanks for storing the fuel. If a welding head employing a torch type element is used instead of the electric welding head illustrated in the drawings, additional storage tanks may be provided on the vehicle 1 for the acetylent or other gasses or materials required.

The apparatus illustrated in the drawings thus comprises a vehicle or chassis carrying an automatic welding head, a torque head for gripping the adjacent ends of the pipe sections, and rotating them past the welding head while holding the two ends immobile relative to one another, and a power source for propelling the vehicle and operating the gripping and rotating means, the welding head and various auxiliary mechanism. The apparatus also includes control mechanism for coordinating the operation of the component parts of the unit.

The welding head H, and the torque head 2, of the apparatus illustrated in Fig. 1, are shown in greater detail in Figs. 2 to 6. The torque head 2 comprises axially spaced gripping dies 23 and 24 rotatably mounted in a casing or housing 22, carried at the outer end of the boom 3 (Fig. 1). The grippers 23, 24 may be of any construction that will grip the pipe sufficiently tightly to hold the ends of the pipe immobile relative to one another, and apply the necessary torque to turn or twist the pipe without slipping. In the construction shown in the drawings, each of the gripper dies comprises an inner ring 25, 26 having an inclined or conical outer surface and an outer ring 27, 28 having an inclined or conical inner surface adapted to engage the outer surface of the inner ring so that by relative axial movement of the two rings the inner ring can be caused to grip the pipe. Suitable means (not shown) for example bolts, screws, hydraulic or cam surfaces, are provided for effecting the relative axial movement of the two-ring portion. The inner ring 25, 26, may be made sectional or contractible so as to be contracted to grip the pipe upon application of pressure by the outer ring. The inner ring is preferably also provided with serrations or teeth at its inner surface to grip the pipe more tightly.

Figures 2, 6:
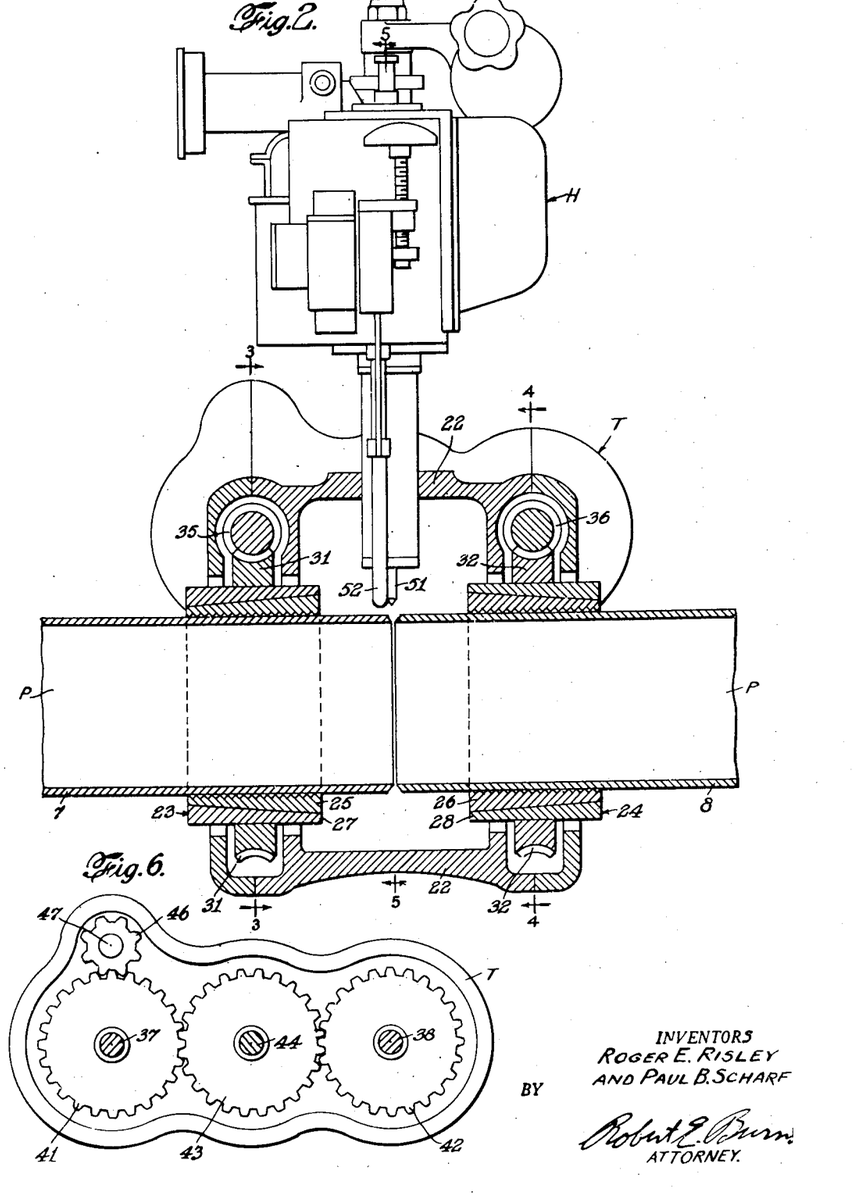
Fig. 2 is an enlarged vertical section, through the axis of the pipe, approximately on the line 2—2 of Fig. 1, parts of the welding head being shown in elevation.
Fig. 6 is a view taken approximately on the line 6—6 in Fig. 3, and showing certain of the gearing for rotating the pipe.
Figure 3:
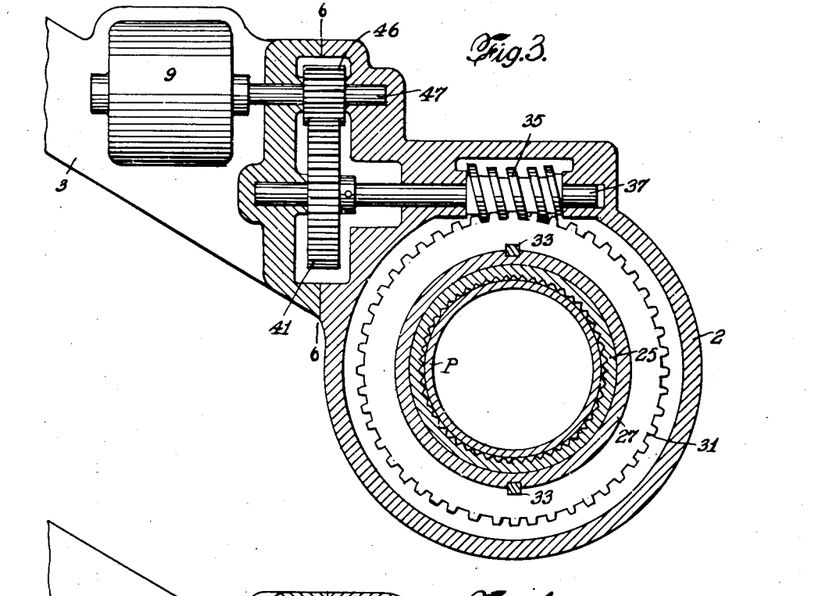
Figs. 3, 4 and 5 are transverse sections taken approximately on the lines 3—3, 4—4 and 5—5 in Fig. 2.
Figures 4, 10:
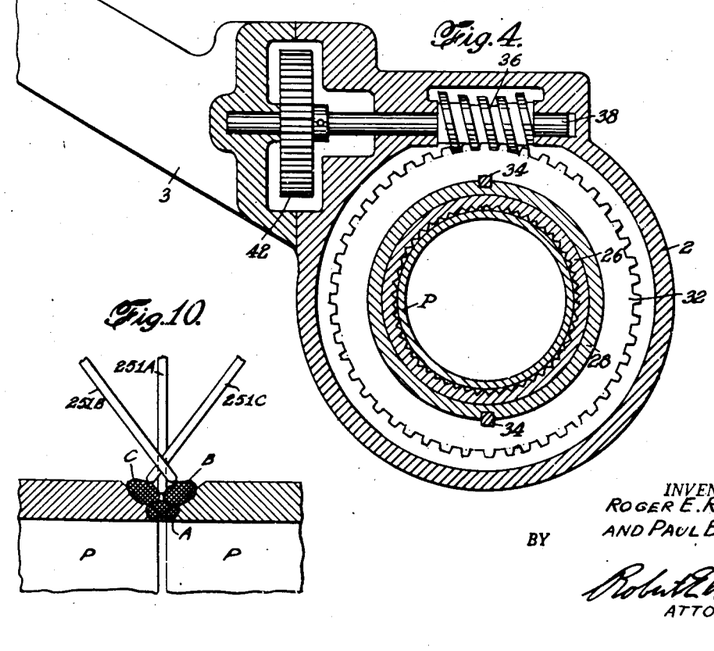
Fig. 10 is a schematic view showing a further modification.

Each of the gripping dies 23, 24 carries a gear ring 31, 32 shown in the form of an annular worm gear, which surrounds the gripping element and is non-rotatably connected therewith, for example by keys 33, 34 (Figs. 3 and 4). The worm gear 31 engages a worm 35 on a shaft 37, which is rotatably mounted in the housing 22 of the torque head 2, the worm being held by suitable thrust bearings against axial movement. The worm gear 32, carried by the gripping die 24, engages a worm 36 on a shaft 38, likewise mounted in the housing 22. The worm shafts 37 and 38 are operatively connected with one another through a positive drive which compels the worms and hence the worm gears 31, 32, and the gripping dies 23, 24 to rotate in the same direction and at the same speed. As illustrated in Fig. 6 of the drawings, the connecting drive comprises a spur gear 41 on shaft 37, a spur gear 42 on shaft 38, and an idler gear 43 rotatable on a shaft 44, and meshing with both the gear 41 and the gear 42. Power for driving the gears to rotate the gripping dies 23 and 24 is supplied by the electric motor 9 (Figs. 1 and 3) referred to above. The motor may be connected to drive either shaft 37, 38 or the intermediate gear 43, but is shown in the drawings as being provided with a pinion 46 mounted on the motor shaft 47, and meshing with the spur gear 41 mounted on shaft 37. It will be understood that the other worm shaft 38 will be driven in the same direction and at the same speed through the interconnecting gear 43. In order that the direction of rotation of the pipe sections may be reversed, provision is made for reversing the rotation of the driving worms 35 and 36. This may be done by providing suitable reversing gearing, but it is considered preferable to use a reversible electric motor as the driving motor 9 of the torque head. The worm gear drive provides an effective gear reduction so that the pipe held by the grippers 23, 24 can be rotated slowly and at uniform speed by a motor running at a much higher speed. Moreover, the worm drive holds the pipe in whatever position it is rotated by the motor, and prevents the pipe from driving the motor when for example the pipe line has been torsioned and is untwisting. The speed of rotation of the pipe is thus under full control of the motor at all times.

It will be understood that one of the grippers 23 is adapted to grip the end of one of the pipe sections, for example the end section of the pipe line, and the other gripper 24 is adapted to grip the adjacent end of the other pipe section, the ends of the two sections being thus held firmly and rigidly in position to be welded together. Rotation of the grippers 23, 24 by the driving mechanism described, causes the two pipe sections to be rotated in unison and at predetermined speed, while the ends of the sections are held immobile relative to one another. The additional pipe section 8 being welded to the pipe line may be further supported by the cradle 11 illustrated in Fig. 1, and described above.

The welding head H, positioned to weld the two ends of the pipe sections together as they are rotated by the torque head 2, may be of any suitable type, an automatic electric arc welding head being illustrated by way of example in the drawings. The welding head is shown as having an electrode 51 (Figs. 2 and 5) which may be formed of metal or other conductive material, but is preferably a carbon electrode. The electrode 51 is connected with one lead of a source of electric current, the other lead being grounded to the pipe, for example, through one or both of the grippers, 23, 24. The welding head also has a feeding tube or guide 52 for feeding a filler rod or wire into the arc of the electrode 51, so as to lay a bead of molten metal along the weld line, as the pipe is rotated past the welding head. Provision is made for adjusting the position of the electrode 51, and of the filler rod guide 52, so that these elements may be accurately positioned relative to the ends of the pipe sections. mechanism is also provided for automatically moving the electrode 51 toward and away from the pipe, to establish and maintain a uniform arc, when the welding head is in operation. The welding head is further provided with automatic feeding mechanism for feeding the filler rod into the weld at a predetermined and adjustable rate. As these automatic controls are well known in the art, they are not herein described in further detail.

As clearly illustrated in the drawings, the welding head H is located above the pipe, in such position that the electrode 51 is directly above the line of weld between the ends of the two pipe sections. If desired, provision may be made for oscillating or weaving the electrode 51, as the pipe is rotated past it, so that a wider area is heated by the arc. Moreover, instead of a single electrode as shown in Figs. 5 and 8, a plurality of electrodes 151 may be provided, as indicated schematically in Fig. 9. Where there is more than one electrode, each of the electrodes is preferably individually controlled, and each may be provided with means for feeding a filler rod into the arc. Alternatively, a plurality of separate welding heads H may be associated with the torque head 2.

Mechanism may also be associated with the torque head 2, for automatically cleaning or otherwise preparing the ends of the pipe in advance of welding, and for peening, heat treating, or otherwise conditioning the metal along the weld line after welding. Thus for example in Fig. 9, a rotary wire brush abrasive wheel, or other cleaning device, is indicated schematically at 61, and a shot-blasting device or other device for treating the metal after formation of the weld, is indicated schematically at 62. The direction of rotation of the pipe during the welding operation is indicated by the arrow. While the cleaning and post-treating devices are shown in conjunction with a plurality of electrodes, it will be understood that they are equally applicable to apparatus in which a single electrode or welding head is employed. It will be appreciated that the cleaning device 61, the welding head H, and the post-treating device, may all be operated concurrently so that as the pipe is rotated the ends of the pipe are cleaned, welded together and peened, or otherwise post-treated in one operation. The timing of the various elements operating on the pipe is coordinated so that each will start and stop at the proper point. When a plurality of electrodes is used, as illustrated in Fig. 9, the timing is such that the ends of the beads formed by the respective electrodes are staggered relative to one another, as indicated for example at E1 and E2.

Where a plurality of welding elements or electrodes is employed they may be staggered transversely of the weld line, as illustrated by way of example in Fig. 10. This figure represents a longitudinal section through the adjacent ends of the pipe sections and shows the welding element as three electrodes 25la, 25lb and 25lc, which are so disposed that the beads A, B and C laid by the respective electrodes, are offset laterally from one another. The transverse staggering of the beads is particularly desirable in the case of welding relatively thick walled pipe. It will be noted that the electrodes are arranged at different angles to one another so as to act more effectively in laying the beads in the position desired. The transversely offset electrodes may also be spaced circumferentially of the pipe, as illustrated in Fig. 9, and may be operated as described in connection with that figure to control the starting and stopping points of the respective beads.

The operation of the component parts of the apparatus and the timing of the various operations are coordinated by an automatic control system, an embodiment of which is illustrated schematically in Fig. 7. As shown in this figure, the engine 18 for driving the vehicle or tractor 1 also drives an electric power generator 19 and welding generator 19W as well as a hydraulic pump 21 for supplying fluid pressure to operate hydraulic portions of the apparatus. One lead 64 of the welding generator 19W is grounded to the pipe P, for example, by being electrically connected to the gripping die 23. The other lead 65 of the welding generator extends to the welding head H. A control cable 66 comprising any required number of conductors extends from the welding generator 19W to a control panel 67, a control cable 68 extending from the control panel 67 to the automatic welding head H. The power generator 19 is shown connected with the control panel 67 by power leads 69 and a control cable 70. The electric motor 9 for rotating the gripping dies 23 and 24 and thereby rotating the pipe section, is likewise connected with the control panel 67, for example, by leads 71. The control panel 67 is provided with suitable switches, relays and manual controls, and is also connected for example by one or more cables 72 with one or more limit switches 73, which are actuated upon rotation of the pipe to control the extent, direction, and if desired the speed of its rotation. With the connections shown in Fig. 7, the power generator 19, welding generator 19W, the automatic welding head H and the electric motor 9 for reversibly rotating the pipe P, are all under the control of control panel 67, so that the operation and regulation of all of these components of the apparatus can be automatically coordinated. Additional controls, not shown in Fig. 7, are of course provided for driving the tractor and for operating auxiliary equipment. When additional electrodes or welding heads, or additional units, such as the cleaning device 61, and peening device 62 of Fig. 9 are included in the apparatus, the control connections are correspondingly modified to provide suitable control for these additional elements.

The operation of the apparatus shown in Fig. 1 will be apparent from the drawings and the above description. With the gripping dies 23 and 24 of the torque head 2 in open or expanded condition, the gripping die 23 is positioned near the free end of the end section 7 of the pipe line (Fig. 2). A further section of pipe 8 is stabbed through the other gripping die 24 of the torque head and positioned with its end abutting or slightly spaced from the adjacent end of the pipe section 7, the section being also supported at or beyond its center of gravity by the cradle 11 (Fig. 1). The gripping dies 23 and 24 are thereupon closed to grip the two pipe sections tightly and thus hold their ends rigidly in position to be welded together. The motor 9 is then started to rotate the coaxial gripping dies 23 and 24, thereby applying torque to the section 7, to torsion or twist the pipe line while rotating the additional section of pipe 8 in unison with the free end of section 7, and holding the ends of the two sections immobile relative to one another. After rotation of the pipe approximately 180°, the motor 9 is automatically reversed under control of the limit switches 73 to rotate the pipe in the opposite direction. The speed of rotation may, if desired, be reduced. At approximately the same time the welding head H is put into operation and its operation is continued during rotation of the pipe to approximately 360°. The operation of the welding head is thereupon stopped and the direction of rotation of the motor 9 is again reversed, for example, under control of limit switches 73, the pipe being rotated approximately 180° to bring it back to its neutral or unstressed position. As the welding head is not in operation during this portion of the cycle, the speed of rotation of the pipe can, if desired, be increased. This cycle of operation may be repeated or may be varied or modified as desired, to meet different circumstances and conditions. For example, with the arrangement of elements shown in Fig. 9, it is desirable to rotate the pipe through somewhat more than 360° during that portion of the cycle in which the welding head is in operation. After the welding of one pipe joint has been completed, the tractor carrying the apparatus is moved forward to bring the apparatus into position for welding the next section of pipe to the pipe line.

By employing the method and apparatus of the present invention it is thus possible to construct welded pipe lines rapidly and at low cost. Moreover, since the weld throughout the entire circumferential extent of the weld line is formed under optimum conditions and is automatically controlled, the defects inherent to hand welding are avoided and a strong and uniform welded seam is assured at each pipe joint.

What we claim and desire to secure by Letters Patent is:

1. The method of welding a further section of pipe to a pipe line forward of previously joined pipe sections and having a portion that is non-rotatably supported, which comprises placing said further section in position to be joined to the end section at the free end of said line, positioning welding means in optimum position to produce a weld between the adjacent ends of said sections, applying torque to the end section of said line to twist said pipe line and rotate said end section, simultaneously rotating said further section in unison with said end section to cause the adjacent ends of the sections to be welded to rotate past said welding means, and operating said welding means to weld said ends together during rotation.

2. The method of welding a further section of pipe to a pipe line formed of previously joined pipe sections and having a portion that is relatively fixed, which comprises placing said further section in position to be joined to the end section of said line, positioning welding means in position to produce a weld between the adjacent ends of said sections, applying torque to the end section of said line to twist said line and rotate said end section in one direction, reversing the direction of rotation to twist said pipe in the opposite direction, simultaneously rotating said further section in unison with said end section to cause the adjacent ends of said sections to rotate past said welding means, and operating said welding means during rotation of said sections to weld the adjacent ends of said sections together.

3. The method of joining a further section of pipe by fusion welding to a pipe line having a portion non-rotatably supported, which comprises aligning said section in end-to-end relation with the end section of said line in positon to be welded thereto, positioning fusion type welding means in operative position above the weld line, applying torque to twist said pipe line and rotate said sections in unison about their longitudinal axis while maintaining the relative position of said sections to one another independently of any weld connection between said sections, to cause the adjacent end edges of said sections to rotate at a uniform rate past said welding means, and operating said welding means during rotation of said sections to maintain a weld melt at the top of said weld line to weld said sections together.

4. The method of welding a further section of pipe to a pipe line having a portion non-rotatably supported, which comprises clamping said section and the end sections of said pipe line in end-to-end relation with adjacent ends positively held in position to be welded, positioning welding means in position to produce a weld between the adjacent ends of said sections, applying torque to twist said pipe line and rotate said sections about their longitudinal axis while holding them clamped against movement relative to one another, to cause the adjacent ends of said sections to rotate past said welding means, and operating said welding means to weld the adjacent ends of said sections together.

5. The method of welding a further section of pipe to a pipe line having a portion non-rotatably supported, which comprises clamping adjacent ends of said section and the end section of said line in end-to-end relation with adjacent ends positively held in position to be welded, positioning a welding head in position to produce a weld between the adjacent ends of said sections, operating said head to heat adjacent end portions of said sections to welding temperature while simultaneously applying torque to twist said pipe line and rotate said clamped sections past said welding head to lay a plurality of beads of metal throughout the peripheral extent of the weld line.

6. The method of welding sections of pipe successively to a pipe line having a portion non-rotatably supported, which comprises clamping a section of pipe in position to be welded to the end section of said line, positioning welding means in position to produce a weld between adjacent ends of said sections, applying torque to twist the pipe line and said clamped sections in unison to cause the adjacent end portions of said sections to rotate past said welding means, concurrently operating said welding means to weld the adjacent ends of said sections together, clamping a further section of pipe in position to be welded to the section last welded to the pipe line and repeating said welding operations.

7. A mobile pipe welding unit comprising a vehicle, a torque head maneuverably carried by said vehicle and held against rotation, means associated with said torque head for externally gripping adjacent pipe sections and holding the adjacent ends thereof in position to be welded together, means for rotating said sections while held by said gripping means, welding means comprising a plurality of welding elements spaced circumferentially of the pipe and operable to lay a plurality of transversely staggered beads concurrently along the line of junction of said pipe sections as said sections are rotated, and timing control means automatically coordinating the operation of said welding elements with the rotation of said sections to stagger the ends of respective beads circumferentially of the pipe so that the start of each of the respective beads is circumferentially spaced from the start of other beads.

8. The method of welding a section of pipe to a pipe line having a portion non-rotatably supported, which comprises clamping said section and the end section of the pipe in end-to-end relation with adjacent ends positively held in position to be welded together, positioning welding means in position to produce a weld between the adjacent ends of said sections, applying torque to twist said pipe line and rotate said sections alternately in opposite directions about their longitudinal axis while holding them clamped against movement relative to one another, to cause the adjacent ends of said sections to rotate past said welding means, and operating said welding means during rotation in both directions to weld the adjacent ends of said sections together.

9. The method of welding a section of pipe to a pipe line having a portion non-rotatably supported, which comprises clamping said section and the end section of the pipe in end-to-end relation with adjacent ends positively held in position to be welded together, positioning welding means in position to produce a weld between the adjacent ends of said sections, applying torque to twist said pipe line and rotate said sections approximately one-half a revolution, reversing the direction of rotation and rotating said sections approximately a revolution in the opposite direction and concurrently operating said welding means to weld the adjacent ends of said sections together throughout their circumference, and again reversing the direction of rotation and rotating said sections approximately half a revolution.

10. A mobile pipe welding unit comprising a vehicle, a boom carried by said vehicle, means for manipulating said boom, a torque head carried by said boom, means associated with said torque head for gripping adjacent ends of two sections of pipe and holding said ends in position to be welded together, means for rotating said gripping means to rotate said pipe sections in unison about their longitudinal axis while maintaining them immobile relative to one another, a welding head positioned and operative to form a weld between the ends of said pipe sections as said sections are rotated, and a power source carried by said vehicle for supplying energy to operate said boom, gripping means and welding head.

11. A mobile pipe welding unit comprising a vehicle, a boom carried by said vehicle, means for manipulating said boom, a torque head carried by said boom, axially spaced gripping means associated with said torque head for gripping adjacent ends of two sections of pipe and holding said ends in position to be welded together, means for rotating said gripping means in unison to rotate said pipe sections about their longitudinal axis while maintaining them immobile relative to one another, a welding head carried by said boom and positioned between said gripping means to form a weld between the ends of said pipe sections as said sections are rotated, and power means carried by said vehicle to supply energy to operate said boom, gripping means and welding head.

12. A mobile pipe welding unit comprising a vehicle, a torque head housing maneuverably carried by said vehicle, and held against rotation, spaced axially aligned gripping dies rotatably mounted in said housing each comprising a contractible inner ring having an inclined outer surface and an outer ring having an inclined inner surface adapted to engage the outer surface of the inner ring to cause the inner ring to grip the pipe upon relative axial movement of the inner and outer rings, an annular gear connected for movement with each of said gripping dies, means for rotating said gears in unison, and a welding head associated with said torque head casing between said gripping dies.

13. A mobile pipe welding unit comprising a vehicle, a torque head maneuverably carried by said vehicle, means rotatably carried by said torque head for gripping the adjacent ends of two sections of pipe and holding said ends in position to be welded together, means for rotating said gripping means to rotate said pipe sections in unison about their longitudinal axis, a welding head associated with said torque head and operative to form a weld between the ends of said pipe sections and means associated with said torque head for peening the weld and the metal along the weld line as said sections are rotated.

14. A mobile pipe welding unit comprising a vehicle, a torque head maneuverably carried by said vehicle, means rotatably carried by said torque head for gripping the adjacent ends of two sections of pipe and holding said ends in position to be welded together, means for rotating said gripping means to rotate said pipe sections in unison about their longitudinal axis, means associated with said torque head for cleaning the adjacent ends of said pipe sections as said sections are rotated by said gripping means and a welding head associated with said torque head and operative to form a weld between said ends immediately after they are cleaned.

15. A mobile pipe welding unit comprising a vehicle, a torque head maneuverably carried by said vehicle and held against rotation, means associated with said torque head for gripping adjacent ends of two sections of pipe and holding said ends in position to be welded together, means for rotating said gripping means to rotate said pipe sections in unison about their longitudinal axis while maintaining them immobile relative to one another, a welding head positioned and operative to form a weld between the ends of said pipe sections as said sections are rotated, and a power source carried by said vehicle for supplying energy to operate said torque head, gripping means and welding head.

ROGER E. RISLEY.
PAUL B. SCHARF.

REFERENCES CITED

The following references are of record in the file of this patent:

UNITED STATES PATENTS

| Number | Name | Date |
|---|---|---|
| 1,371,094 | Holslag | Mar. 8, 1921 |
| 1,446,170 | Fay | Feb. 20, 1923 |
| 1,622,251 | Nelson | Mar. 22, 1927 |
| 1,907,702 | Anderson | May 9, 1933 |
| 1,933,340 | Raymond | Oct. 31, 1933 |
| 1,938,819 | Eskilson | Dec. 12, 1933 |
| 2,013,630 | Goldsborough | Sept. 3, 1935 |
| 2,062,460 | Lee | Dec. 1, 1936 |
| 2,160,586 | Gettig et al. | May 30, 1939 |
| 2,254,792 | Brown | Sept. 2, 1941 |
| 2,304,976 | Watter | Dec. 15, 1942 |
| 2,320,824 | Landis et al. | June 1, 1943 |
| 2,344,534 | Bucknam et al. | Mar. 21, 1944 |